United States Patent
Ehluss

Patent Number: 5,365,870
Date of Patent: Nov. 22, 1994

[54] BODY EQUIPPED WITH A STREAMLINED PROFILE, IN PARTICULAR A STABILIZER FIN FOR SHIPS WITH A TURBULENCE REDUCING STRUCTURE AND METHOD OF USING THE TURBULENCE REDUCING STRUCTURE

[75] Inventor: Heinz-Günter Ehluss, Tornesch, Germany

[73] Assignee: Blohm & Voss AG, Hamburg, Germany

[21] Appl. No.: 934,169

[22] Filed: Aug. 21, 1992

[30] Foreign Application Priority Data

Sep. 4, 1991 [DE] Germany ............... 4129358
Jan. 31, 1992 [DE] Germany ............... 4202745

[51] Int. Cl.$^5$ .............................. B63B 39/06
[52] U.S. Cl. ................... 114/126; 114/140; 114/162; 114/67 R
[58] Field of Search ........... 114/67 R, 126, 140, 114/162, 127, 141, 142, 143; 244/199, 200

[56] References Cited

U.S. PATENT DOCUMENTS

| | | | |
|---|---|---|---|
| 1,352,998 | 9/1920 | Thompson | 114/67 R |
| 1,639,675 | 8/1927 | Snadecki | 114/162 |
| 2,099,229 | 11/1937 | Possenheim | 114/162 |
| 2,550,752 | 5/1951 | Allan | |
| 2,743,888 | 5/1956 | Lippisch | |
| 3,847,104 | 11/1974 | Kaufer | 114/162 |
| 3,931,781 | 1/1976 | Larsh | 114/126 |
| 4,023,516 | 5/1977 | Bennet | 114/126 |
| 4,631,036 | 12/1986 | Grothues-Spork | 114/126 |
| 4,825,795 | 5/1989 | Slemmons | 114/140 |

FOREIGN PATENT DOCUMENTS

| | | | |
|---|---|---|---|
| 0244334 | 11/1987 | European Pat. Off. | |
| 2355188 | 1/1978 | France | |
| 2136739 | 9/1984 | United Kingdom | 114/140 |
| 8800153 | 1/1988 | WIPO | |

Primary Examiner—Stephen P. Avila
Attorney, Agent, or Firm—Nils H. Ljungman & Associates

[57] ABSTRACT

On a body, for example a stabilizer fin or a rudder blade on ships or the keel fin on sailboats with a keel, which is fastened to a support body, preferably a ship's hull, so that it projects outward, several ribs are fastened so that they project on the exposed end of the body. These ribs are located at some distance from one another and are parallel to the plane of symmetry of the body. The length of the ribs is approximately 1/10 to 1/20 of the length of the body, which eliminates or reduces turbulence which occurs at the end of the wing like structure.

8 Claims, 8 Drawing Sheets

BODY EQUIPPED WITH A STREAMLINED PROFILE, IN PARTICULAR A STABILIZER FIN FOR SHIPS WITH A TURBULENCE REDUCING STRUCTURE AND METHOD OF USING THE TURBULENCE REDUCING STRUCTURE

BACKGROUND OF THE INVENTION

1. Field of the Invention

This invention relates to a body on ships equipped with a streamlined profile, which is symmetrical in relation to its longitudinal center plane.

Bodies of this type experience a pressure reduction on the side away from the inflowing medium, and a pressure increase on the side facing the medium.

The result of this effect is that on the exposed end of the body, there is a pressure equalization caused by the medium flowing around the body, and a resulting high-energy wing-tip turbulence, a so-called negative vortex.

Such turbulence naturally wastes energy which, on objects moving in a liquid medium, as is the case in particular for ships, has a negative effect on the propulsion efficiency.

2. Background Information

On bodies designed as stabilizer fins, a solution has been proposed in the installation of means to reduce the above-mentioned negative vortex such as in German Patent No. DE-PS 1956032. These means consist of passages in the vicinity of the exposed end of the body, i.e. in the vicinity of the end cap, which run through the body diagonally, front to back in relation to the current direction. The medium enters these passages through a frontal opening and exits once again toward the rear.

This solution of the prior art may be effective in suppressing the above-mentioned turbulence, but in addition to reducing the inflow surface, it also causes problems from the point of view of fabrication and strength. On account of the flow in the passages, the solution of the prior art also encourages cavitation caused by abrupt changes in velocity, with its undesirable consequences, such as erosion of the material of which the body is made, underwater noises and vibration phenomena.

OBJECT OF THE INVENTION

The object of the invention is to eliminate or at least reduce the above-mentioned deficiencies.

SUMMARY OF THE INVENTION

This object is achieved by means of the invention, by the features disclosed herein. The ribs located next to one another which project outward from the exposed end of the wing and the spaces located between these ribs do not reduce the effective lifting surface of the body, are relatively economical to construct, and do not weaken or reduce the cross section of the body itself.

The conditions which promote the occurrence of cavitation are also avoided, because the ribs, as noted above, are outside the lifting surface and thus cannot promote the separation of the flow.

U.S. Pat. No. 3,931,781 discloses stabilizer fins for ships, whereby the fins are equipped with three or more plates, oriented parallel to one another and at some distance from one another, running parallel to the direction of flow of the sea water. The present invention promotes strength and flow conditions which are enhanced by the compact, streamlined wing according to the invention.

One aspect of the invention resides broadly in a method of reducing turbulence at at least one surface of a vessel caused by the motion of the vessel through water, the method comprising the steps of: positioning at least one planar body in at least one region of turbulence at at least one surface of the vessel, which turbulence is caused by the motion of the vessel through water; and reducing said turbulence in the at least one region of turbulence caused by the motion of the vessel through water with the at least one planar body.

Another aspect of the invention resides broadly in an arrangement for reducing turbulence at at least one surface of a vessel caused by the motion of the vessel through water, the arrangement comprising: at least one planar body, for reducing the turbulence in at least one region of turbulence caused by the motion of the vessel through water with the at least one planar body, the at least one planar body being disposed in the at least one region of turbulence at at least one surface of the vessel, which turbulence is caused by the motion of the vessel through water.

Yet another aspect of the invention resides broadly in a method of using an arrangement for reducing turbulence at at least one surface of a vessel caused by the motion of the vessel through water, the method comprising the steps of: providing at least one planar body, for reducing the turbulence in at least one region of turbulence caused by the motion of the vessel through water with the at least one planar body, the at least one planar body being disposed in the at least one region of turbulence at at least one surface of the vessel, which turbulence is caused by the motion of the vessel through water; positioning the at least one planar body in at least one region of turbulence at at least one surface of the vessel, which turbulence is caused by the motion of the vessel through water; and reducing the turbulence in the at least one region of turbulence caused by the motion of the vessel through water with the at least one planar body.

Various embodiments and advantageous sizes of the object of the invention are disclosed in the subclaims.

BRIEF DESCRIPTION OF THE DRAWINGS

FIGS. 1, 1a, 2, 2a, 3 and 3a in the accompanying drawings illustrate a preferred embodiment of the invention, in the form of a two-piece stabilizer fin for ships. FIGS. 4–12 illustrate additional embodiments of the invention.

DESCRIPTION OF THE PREFERRED EMBODIMENTS

The number 1 is used to designate a main fin in its entirety, to which a secondary fin 2 is attached so that it can pivot.

The main fin 1 makes the transition on its one end into an oval flange 3, which is anchored by means of a number of screws 5 to a fin shaft which rotates around the longitudinal axis A of the fin, and is illustrated only schematically.

The main fin 1, on its flange-side half 1b, is designed so that it is slightly conically thickened toward the flange 3, while its end-side half 1a has a uniform thickness.

Figure 3:
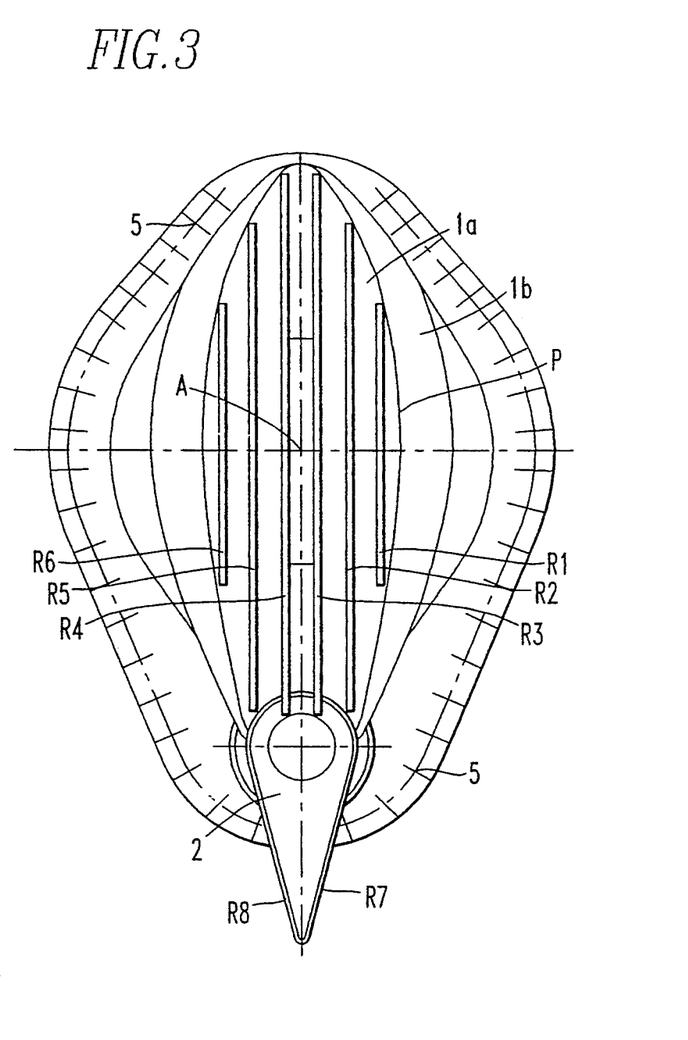
FIGS. 3 and 3a show a side elevation of the stabilizer fin.

In cross section, the main fin 1 has a streamlined profile P which is symmetrical in relation to its longitudinal center plane. As shown in FIG. 3, the profile P has the conventional teardrop shape. On the exposed end of the fin part 1a, six ribs R1, R2, R3, R4, R5 and R6 are fastened at some distance from one another, and are oriented both parallel to one another and parallel to the longitudinal center plane of the main fin. In alternative embodiments there may be more or less than six ribs, such as, between two and ten ribs, or more, which would include 2, 3, 4, 5, 6, 7, 8, 9 and 10 ribs, at least.

The spaces remaining between the fins R1 to R6 are the same as one another, and in the illustrated embodiment are approximately four times the thickness of the rib wall. The shape of the ribs in the illustrated embodiment is selected so that the contour of their outer limits coincides with the end cap customary on such fins, which is curved outward and fitted to the cross section profile.

The secondary fin 2 is also equipped with ribs R7 and R8, which are not parallel to one another, but are parallel to the inflow and slipstream surfaces of the secondary fin 2. The nozzle effect thereby achieved promotes the suppression of the turbulence on the main fin 1.

In other words, reference numeral 1 is used in FIGS. 1, 1a, 2 and 2a to designate a main fin in its entirety. The longitudinal axis A of the main fin 1 is shown in FIGS. 1, 1a, 2, 2a, 3 and 3a. The longitudinal axis A may be horizontal and may be perpendicular to a line between the front and rear of the ship.

Figure 2:
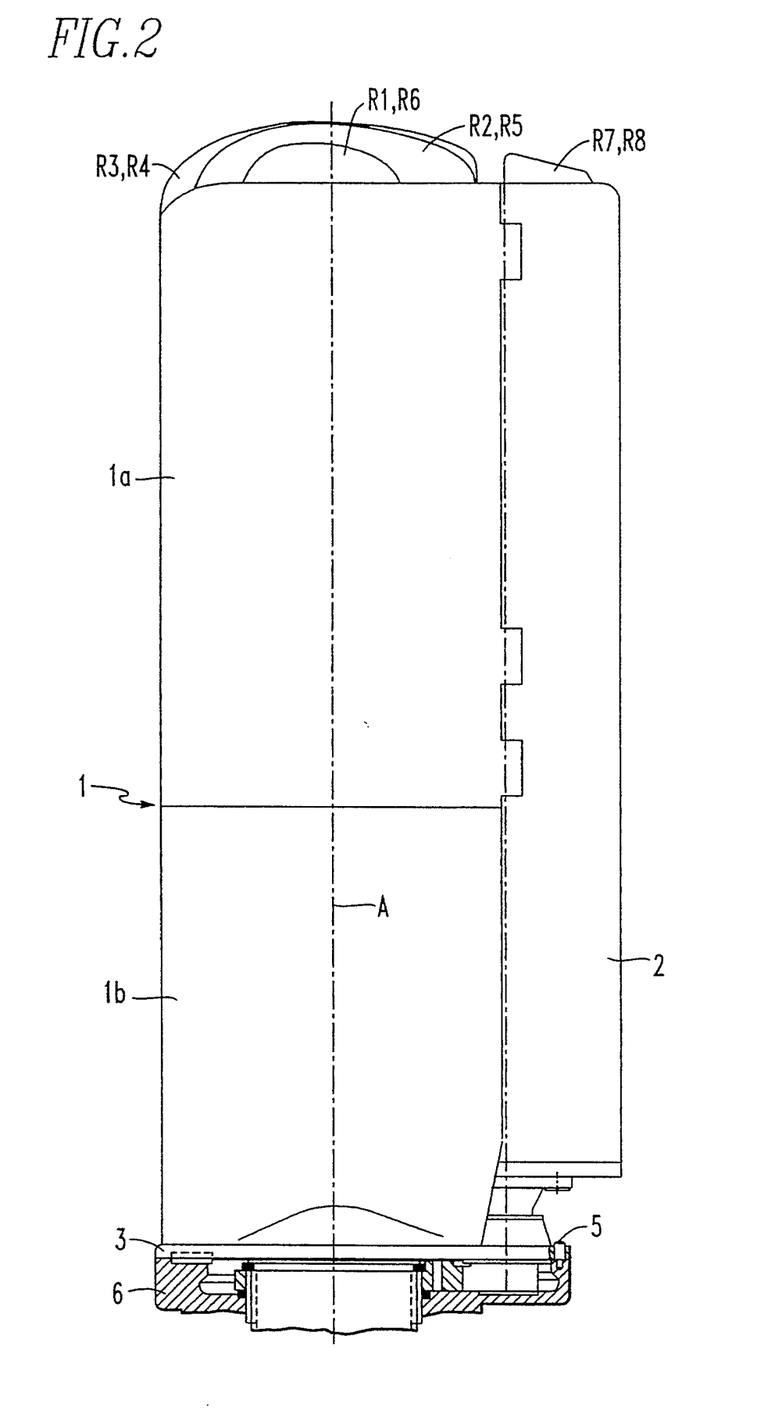
FIGS. 2 and 2a show an upright projection of the stabilizer fin.
Figure 2A:
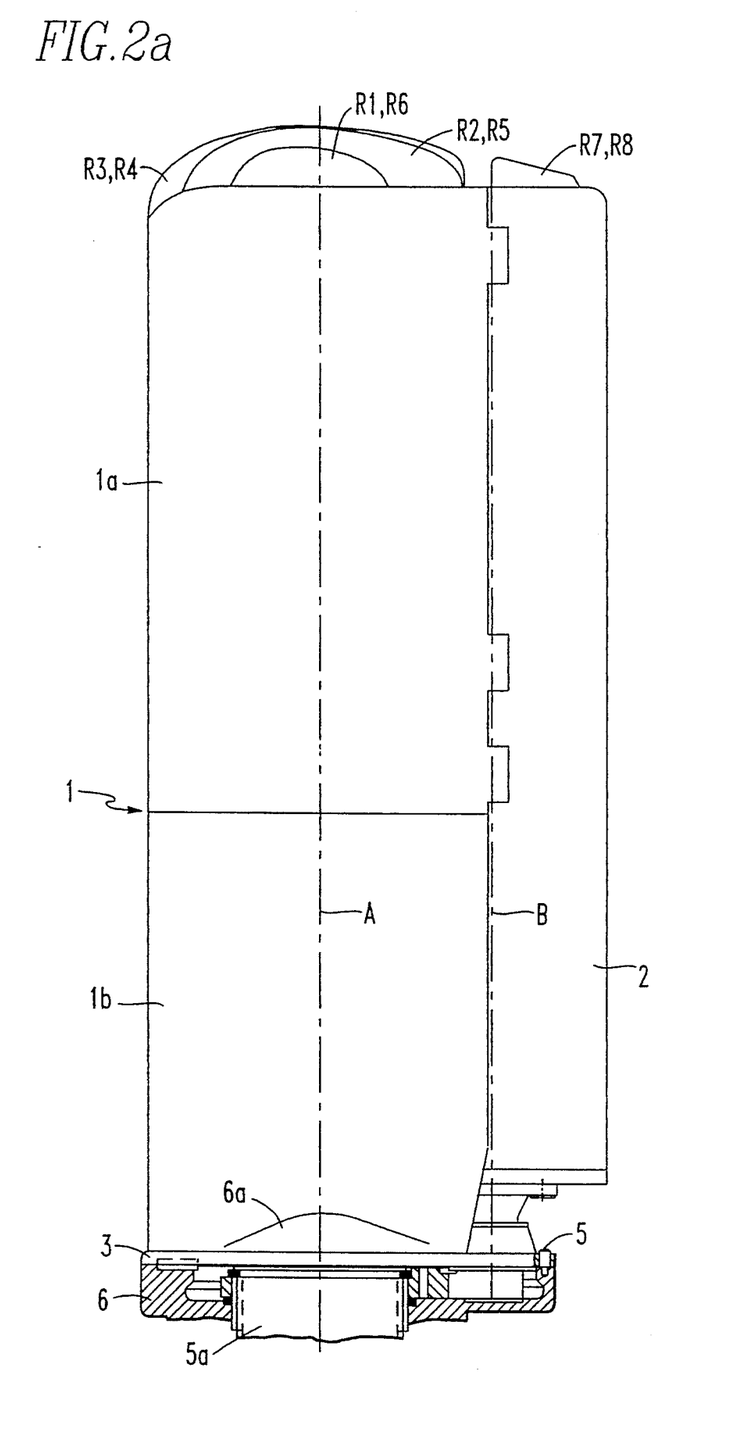

The free side of the main fin 1 is the generally planar face at the end of the main fin 1 furthest from the ship. The free side of the main fin 1 may be perpendicular to the longitudinal axis A. The main fin 1 has a ship-side section 1b and a free-side section 1a. The ship-side section 1b is located along the longitudinal axis A between the ship and the free-side section 1a. The main fin 1 may have an oval flange 3 on the end of the main fin 1 nearest the ship. The oval flange 3 is anchored to a fin shaft 5a, which is illustrated only schematically. As shown in FIGS. 2 and 2a, the screws 5 anchor the oval flange 3 to the anchoring structure 6. The anchoring structure 6 is rigidly connected to the fin shaft 5a. The fin shaft 5a can rotate around the longitudinal axis A, thereby rotating the main fin 1.

The terms "to the front" and "to the rear" mean the horizontal directions toward the front and the rear, respectively, of the ship.

The term "length", as applied to the main fin 1, the ship-side section 1b, the free-side section 1a and the secondary fin 2, refers to a dimension in the direction parallel to the longitudinal axis A. The term "width" as applied to those same elements refers to a dimension in the front to rear direction. The term "thickness" as applied to those same elements refers to a vertical dimension.

Figure 3A:
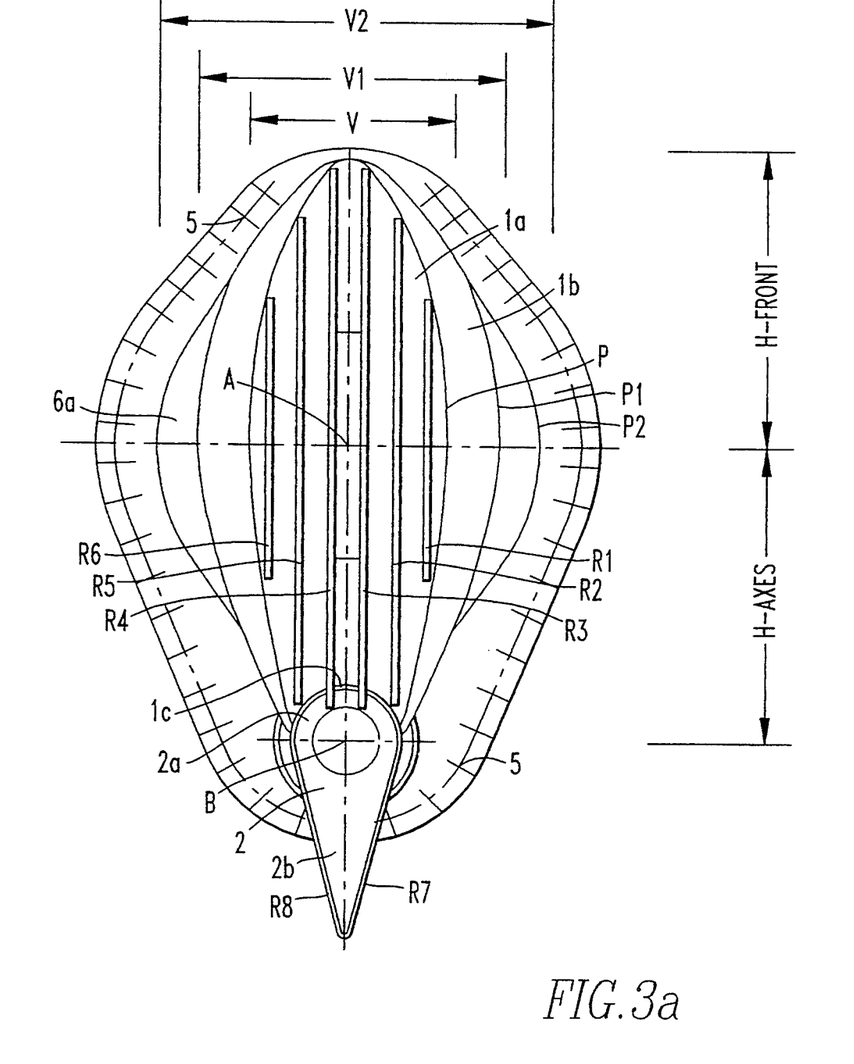

A secondary fin 2 is attached to the main fin 1. The secondary fin 2 may be located to the rear of the main fin 1. The secondary fin 2 has a longitudinal axis B as shown in FIGS. 2a and 3a. The secondary fin 2 preferably can pivot about the longitudinal axis B. The secondary fin 2 may be attached to the main fin 1 at points along the free-side section 1a. As shown in FIG. 3a, the secondary fin 2 may have a triangular portion 2b to the rear of the longitudinal axis B, and the secondary fin 2 may have a semicircular portion 2a to the front of the longitudinal axis B. There may be a semicircular concavity 1c in the rear of the main fin 1 along the entire length of the main fin 1. The semicircular concavity 1c may be centered about the longitudinal axis B. The semicircular portion 2a may be positioned in the semicircular concavity 1c.

The free side of the secondary fin 2 is the generally planar face at the end of the secondary fin 2 furthest from the ship. The free side of the secondary fin 2 may be perpendicular to the longitudinal axis B.

As shown in FIGS. 2 and 2a, the free longitudinal end of the secondary fin 2 and the free longitudinal end of the main fin 1 may be at the same distance from the ship. However, the longitudinal end of the secondary fin 2 closest to the ship does not necessarily reach the oval flange 3. The intervening distance between the secondary fin 2 and the oval flange 3 may be occupied by structures that enable the secondary fin 2 to pivot. The semicircular concavity 1c linearly increases in diameter near the oval flange 3. This increase in diameter of the semicircular concavity 1c allows room for the structures that enable the secondary fin 2 to pivot.

The free-side section 1a of the main fin 1 may have a uniform cross section over most of its length. As shown in FIGS. 2 and 2a, the free end of the free-side section 1a may be rounded off such that the length of the main fin 1 is smallest at the front of the main fin 1. The length of the main fin 1 may increase smoothly until the length becomes constant approximately 1/6 of the way from the front of the main fin 1 to the longitudinal axis B. The minimum length of the main fin i may be approximately 3% less than the maximum length of the main fin 1.

Figure 1:
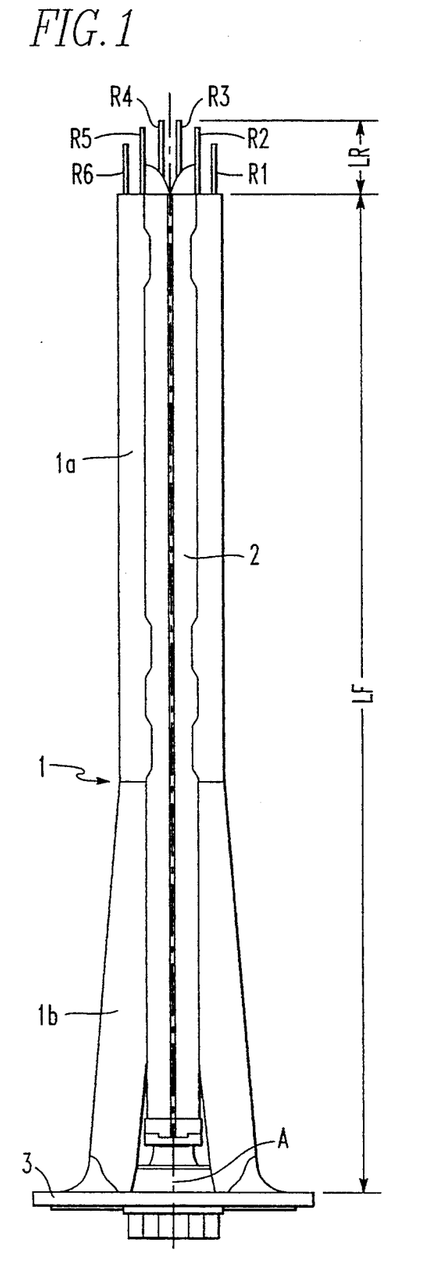
FIGS. 1 and 1a show a horizontal projection from the rear of a stabilizer fin.
Figure 1A:
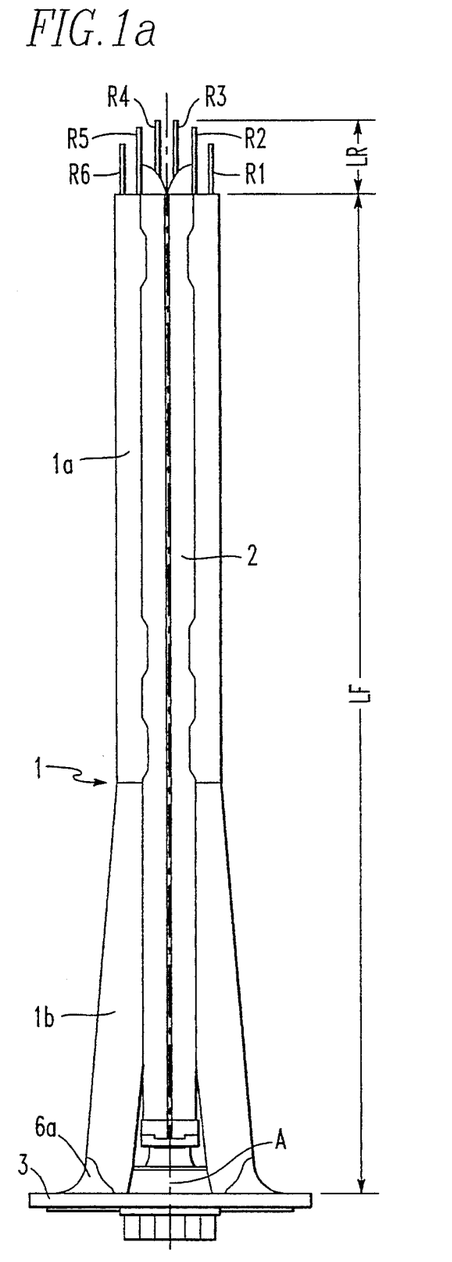

The linear dimensions of the cross section of the ship-side section 1b of the main fin 1 may increase linearly in a direction along the longitudinal axis A toward the ship. Near the flange 3, some of the linear dimensions of the cross section of ship-side section 1b may increase more than linearly to form two flares 6a. As shown in FIGS. 1a, 2a and 3a, the flares 6a may be located on the top and on the bottom of the ship-side section 1b where the ship-side section 1b meets the flange 3. As shown in FIGS. 2a and 3a, there may be flares 6a around only part of the perimeter of the ship-side section 1b. At the flange 3, from front to rear the flares 6a may begin at points approximately 1/5 of the distance from the front of the ship-side section 1b to the longitudinal axis B, and the flares 6a may end at points approximately 4/5 of the distance from the front of the ship-side section 1b to the longitudinal axis B. As shown in FIG. 2a, the height of the flares 6a, i.e. the distance the flares 6a extend along the length of the ship-side section 1b away from the flange 3, may be zero at the points around the perimeter of the ship-side section 1b at the flange 3 where the flares 6a begin and end. The maximum height of the flares 6a may be approximately 3.5% of the length of the main fin 1.

P, shown in FIGS. 3 and 3a, is the profile of a cross section through the free-side section 1a of the main fin 1. The profile P may be streamlined and may be symmetrical about the horizontal plane through the longitudinal axis A. P2, shown in FIG. 3a, is the profile of a cross section through the ship-side section 1b of the main fin 1 where it meets the oval flange 3. P1 is not necessarily the profile of a cross section. P1 is the same as the profile P2 except that it follows the curves where the flares 6a begin on the ship-side section 1b rather than the curves where the flares 6a meet the flange 3.

Referring to FIG. 3a, H-FRONT is the distance between the longitudinal axis A and the front of the main fin 1. H-AXES is the distance between the longitudinal axes A and B. V, V1 and V2 are the maximum vertical thicknesses of the profiles P, P1 and P2. The ratio between H-FRONT and H-AXES may be approximately 1.0:1. The ratio between V and H-FRONT may be approximately 0.66:1, the ratio between V1 and H-FRONT may be approximately 1.00:1, and the ratio between V2 and H-FRONT may be approximately 1.27:1.

The profile P may be approximately the intersection of two half ellipses. The rear half ellipse has a slightly longer major axis than the front half ellipse. The curvatures of the front and rear half ellipses are preferably equal at the points where the front and rear half ellipses intersect. This requires the front half ellipse to be slightly more than exactly half an ellipse, and the rear half ellipse to be slightly less than exactly half an ellipse. Having the rear end of profile P more elongated than the front end of profile P gives profile P a shape more like a teardrop, which makes the profile P more streamlined. The rear of the rear half ellipse may be interrupted by the semicircular concavity 1c. Adding the profile of a cross section of the secondary fin 2 to the profile P eliminates the interruption by the semicircular concavity 1c and adds the triangular cross section of the triangular portion 2b to the rear of profile P. The combined profile may have a shape more like a teardrop and may be more streamlined than is the profile P alone. The comments in this paragraph apply to the profile P1 as well as the profile P.

Six planar bodies or ribs R1, R2, R3, R4, R5 and R6 may be located on the free side of the main fin 1. As shown in FIGS. 1 and 1a, the ribs R1–R6 preferably lie in parallel horizontal planes. The ribs R1 and R6 are preferably identical, the ribs R2 and R5 are preferably identical, and the ribs R3 and R4 are preferably identical. The distances between all adjacent pairs of the ribs R1–R6 are preferably equal. All the ribs R1–R6 preferably have the same thickness. The distance between adjacent faces of pairs of adjacent ribs R1–R6 is preferably approximately four times the thickness of one of the ribs R1–R6. The distance between adjacent faces is the clear distance between adjacent ribs as opposed to the center to center spacing of adjacent ribs.

The distance between the centers of the ribs R1 and R6 may be approximately 80% of V, the maximum vertical thickness of the free-side section 1a. Since the four other ribs R2–R5 are preferably equally spaced between the ribs R1 and R6, the distance between the centers of pairs of adjacent ribs R1–R6 is approximately 16% of the thickness V (80% divided by 5, not 4, inter-rib spacings). Since the distance between the centers of pairs of adjacent ribs R1–R6 includes half the thicknesses of two of the ribs R1–R6 plus a gap which is approximately four times the thickness of one of the ribs R1–R6, the thickness of one of the ribs R1–R6 is approximately 3.2% of the thickness V (16% divided by $(4+\frac{1}{2}+\frac{1}{2})$).

As shown in FIGS. 3 and 3a, the front edges of all the ribs R1–R6 may be located on the profile P, i.e. on the perimeter of the free side of the main fin 1. The rear edges of the ribs R1 and R6 may also be located on the perimeter of the free side of the main fin 1. The rear edges of the ribs R2 and R5 may be located on the interior of the free side of the main fin 1 and not on the perimeter of the free side of the main fin 1. The ribs R3 and R4 may extend to the rear past the perimeter of the free side of the main fin 1. The ribs R3 and R4 may extend to the rear past the front of the semicircular concavity 1c approximately 40% of the way from the front of the semicircular concavity 1c to the longitudinal axis B. The rear edges of the ribs R3 and R4 may be located over the free side of the secondary fin 2.

The terms "height" or "width", as applied to the ribs R1–R6, refer to a dimension in the direction parallel to the longitudinal axis A. As shown in FIGS. 2 and 2a, the contours of the free edges of the ribs R1–R6 may be generally streamlined curves. The ribs R1–R6 may be asymmetric from front to rear. The maximum heights of the ribs R1–R6 may be located closer to the front edges of the ribs R1–R6 than to the rear edges of the ribs R1–R6. The maximum height of the ribs R3 and R4 may be approximately 7.5% of the length of the main fin 1. The maximum height of the ribs R2 and R5 may be approximately 90% of the maximum height of the ribs R3 and R4. The maximum height of the ribs R1 and R6 may be approximately 70% of the maximum height of the ribs R3 and R4.

The height of the ribs R1 and R6 may be zero at the front and the rear of the ribs R1 and R6. The rear edges of the ribs R2 and R5 may be perpendicular to the free side of the main fin 1. The height of the ribs R2 and R5 at their rear edges may be approximately $\frac{1}{3}$ of the maximum height of the ribs R2 and R5. The corners where the rear edges of the ribs R2 and R5 meet the streamlined portions of the free edges of the ribs R2 and R5 may be rounded off. The rearmost points of the ribs R3 and R4 may be located over the secondary fin 2 at a height of approximately $\frac{1}{2}$ of the maximum height of the ribs R3 and R4. Moving from the rearmost points of the ribs R3 and R4 toward the ship, the free edges of the ribs R3 and R4 may extend toward the front to meet the main fin 1 rather than the secondary fin 2. The ribs R3 and R4 may be unattached to the secondary fin 2 and may be not in contact with the secondary fin 2. The shapes of the ribs R1–R6 in the preferred embodiment are selected so that preferably an end cap customary on such fins will fit on the preferred embodiment.

Two ribs R7 and R8 may be located on the free side of the secondary fin 2. The ribs R7 and R8 may be not parallel to one another. The rib R7 may be parallel to the upper surface of the triangular portion 2b of the secondary fin 2, and the rib R7 may be parallel to the lower surface of the triangular portion 2b of the secondary fin 2. The nozzle effect achieved by the ribs R7 and R8 may promote the suppression of the turbulence on the main fin 1.

The term "height", as applied to the ribs R7 and R8, refers to a dimension in the direction parallel to the longitudinal axis B.

Ribs R7 and R8 are preferably identical. As shown in FIGS. 2 and 2a, in the front to rear direction the front edges of the ribs R7 and R8 may be aligned with the longitudinal axis B. The front edges of the ribs R7 and R8 may be perpendicular to the free side of secondary fin 2. The rear ends of the ribs R7 and R8 may be located approximately 80% of the way from the front edges of the ribs R7 and R8 to the rear tip of the secondary fin 2. The height of the front edges of the ribs R7 and R8 may be approximately ½ the maximum height of the ribs R3 and R4. The corners at the free ends of the front edges of the ribs R7 and R8 may be rounded off. The height of the ribs R7 and R8 may decrease linearly from front to rear until the height has decreased to approximately ½ the maximum height of the ribs R7 and R8. Still further toward the rear, the height of the ribs R7 and R8 may decrease increasingly quickly to zero thereby rounding off the rear portions of the ribs R7 and R8.

The means described above to reduce the turbulence can be used not only on the above-mentioned stabilizer fins, but on all streamlined fin-like bodies, on which the inflow direction of the water continuously or occasionally forms an angle with the direction of the longitudinal center plane of the fin-like body. This can be the case on a rudder blade with essentially perpendicular longitudinal extension of a watercraft or on the keel fin or vertical stabilizer of a sailboat with a keel, whereby the above-mentioned angle exists when the rudder blade is set or the sailboat is tacking.

Figure 4:
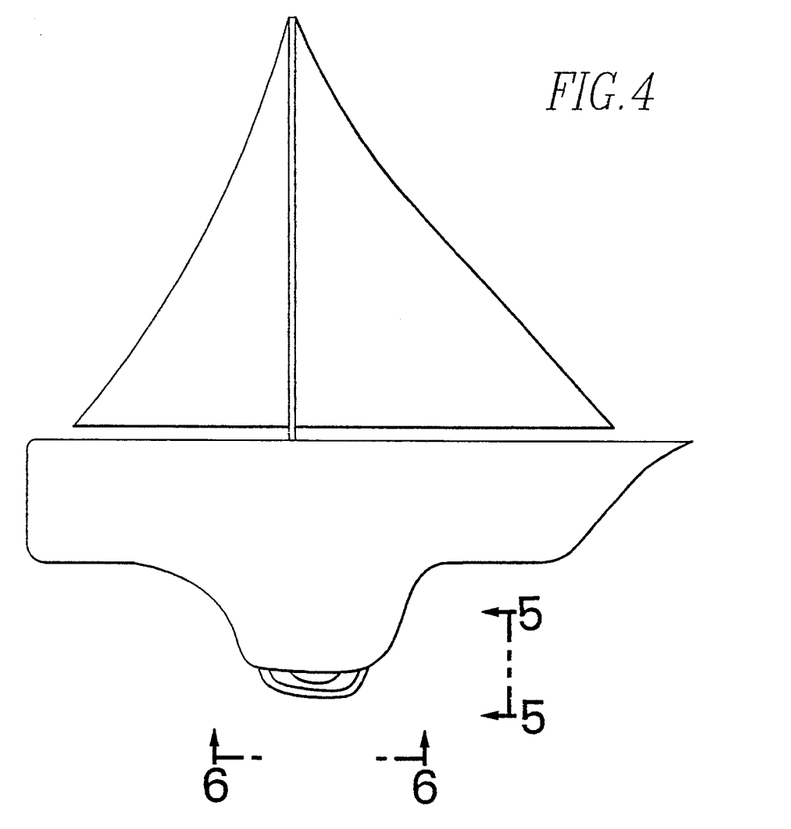
FIG. 4 shows a side elevation of a sailboat with a keel fin.
Figure 5:
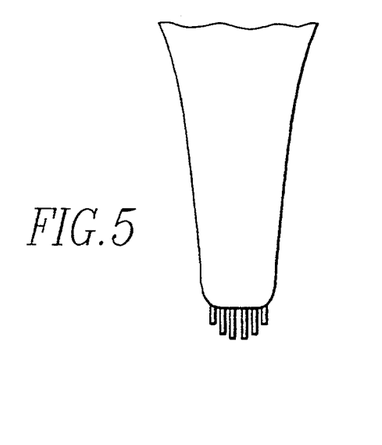
FIG. 5 shows a front view along line 5—5 of the lower portion of the keel fin shown in FIG. 4.
Figure 6:
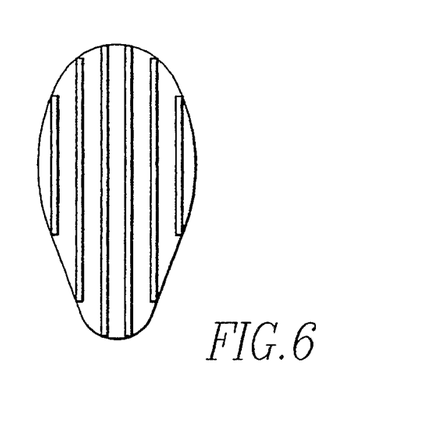
FIG. 6 shows a view from below along line 6—6 of the keel fin shown in FIG. 4.
Figure 7:
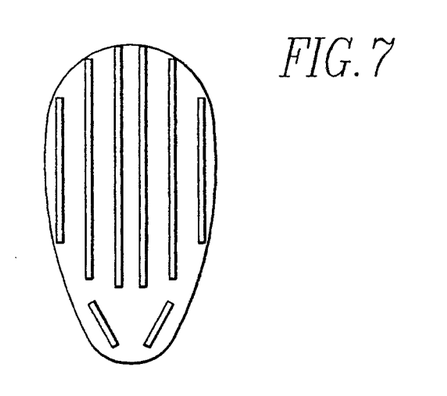
FIG. 7 shows a view from below of a keel fin similar to the keel fin in FIG. 4 but having an alternative arrangement of ribs.

The method of reducing turbulence at the free end of a keel fin of a sailboat by the means described above is shown in FIGS. 4, 5, 6 and 7. A set of several, preferably six, ribs similar to the ribs R1–R6 of the preferred embodiment may be located on the bottom of the keel fin, as shown in FIGS. 4, 5 and 6. This set of several ribs may cover the entire front to back length of the bottom of the keel fin. Alternatively, there may be a set of preferably two ribs similar to R7 and R8 located on the bottom of the keel fin to the rear of the set of several ribs, as shown in FIG. 7.

Figure 8:
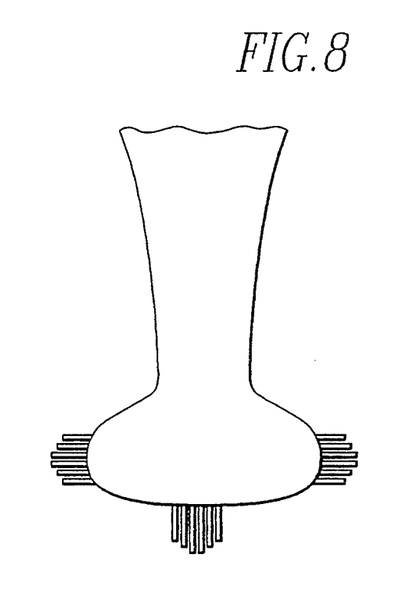
FIG. 8 shows a front view of the lower portion of a keel fin with ballast bodies.
Figure 9:
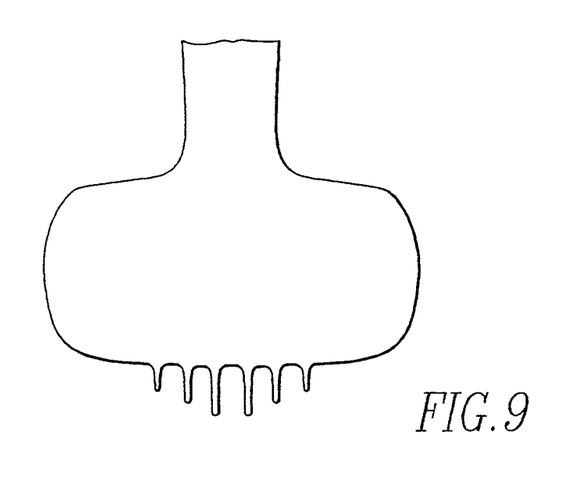
FIG. 9 shows a front view of the surface of a ballast body with formed ribs.

The method of reducing turbulence at the end of a keel fin of a sailboat with ballast bodies by the means described above is shown in FIG. 8. There may be a single set of several, preferably six, ribs at the bottom of the ballast bodies. There may be sets of several, preferably six, ribs at other locations on the ballast bodies such as the two sets of several ribs shown on the sides of the ballast bodies. As shown in FIG. 9, the ribs may be formed on the ballast bodies rather than consisting of separate structures that are attached to the ballast bodies. There may be sets of preferably two additional ribs similar to R7 and R8 located to the rear of any set of several ribs.

Figure 10:
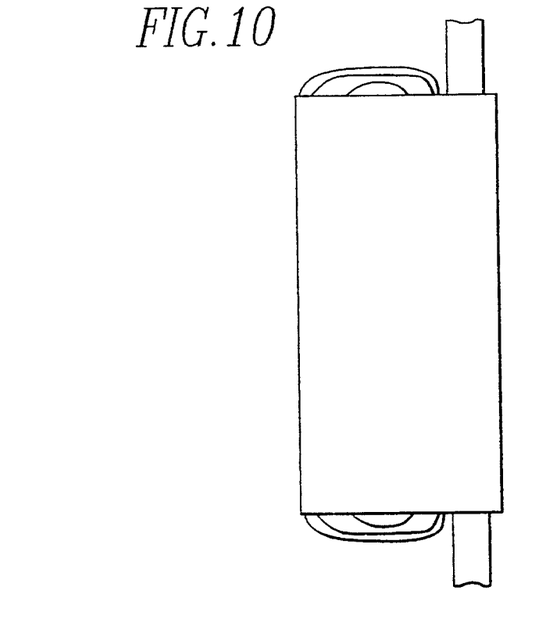
FIG. 10 shows a side view of a rudder.

The method of reducing turbulence on a rudder blade with an essentially perpendicular extension by the means described above is shown in FIG. 10. A set of several, preferably six, ribs similar to the ribs R1–R6 of the preferred embodiment may be located along the bottom of the rudder blade. The top as well as the bottom of the rudder blade is a free end in some rudder configurations. For such rudder configurations a set of several, preferably six, ribs may be located on the top as well as on the bottom of the rudder blade. There may be sets of preferably two additional ribs similar to R7 and R8 located to the rear of either set of several six ribs.

Figure 11:
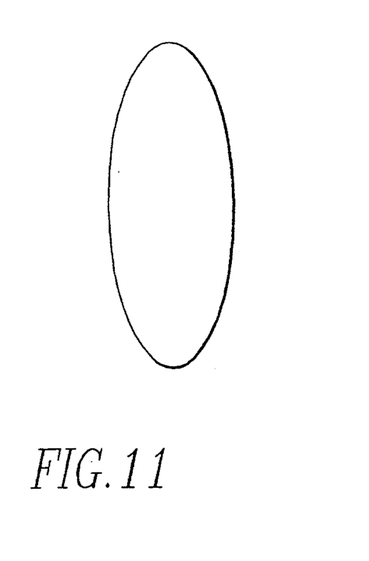
FIG. 11 shows a cross section parallel to the length and thickness of a rib with curved sides.
Figure 12:
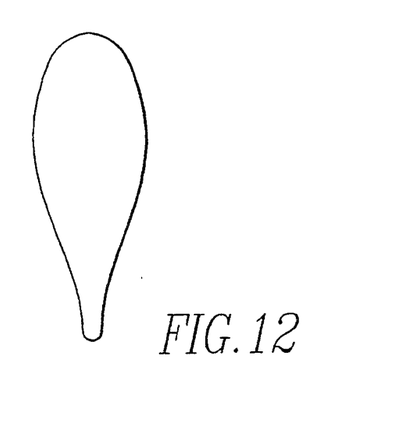
FIG. 12 shows a cross section parallel to the length and thickness of a rib with a teardrop cross section.

The sides of the ribs defined by the two largest dimensions of the ribs in the preferred embodiment are generally shown as being flat in FIGS. 1, 1a, 3 and 3a. In the preferred embodiment and in other embodiments those sides need not be flat, but may be curved in either or both dimensions. The ribs may be teardrop shaped. Examples of cross sections of ribs with such sides are shown in FIGS. 11 and 12. Also, the sides of the ribs defined by the thickness and one other dimension of the ribs may be rounded off.

Examples of stabilizing fin systems on which the method of reducing turbulence by the means described herein may be used are found in U.S. Pat. No. 4,777,899 entitled "Hydraulically Actuated Fin Stabilizer System", U.S. Pat. No. 4,023,516 entitled "Ship Stabilizing Systems", and U.S. Pat. No. 3,924,555 entitled "Stabilizing Fin System". An example of a rudder on which the method of reducing turbulence by the means described above may be used is found in U.S. Pat. No. 4,448,146 entitled "Rudder with a Stabilizer Fin". These patents are hereby incorporated by reference as if set forth in their entirety herein.

One feature of the invention resides broadly in a body which is symmetrical in relation to its longitudinal center plane, and is equipped with a streamlined profile, in particular a stabilizer fin for ships which is pressurized by a liquid medium, preferably seawater, flowing linearly at right angles to its longitudinal extension, and which is fastened at its one longitudinal end to a support body, preferably the ship's hull, so that it can pivot and/or rotate, or be fastened at a stationary angle of incidence in relation to the direction of flow, and is equipped in the vicinity of its other longitudinal end with means to reduce the turbulence which forms at this end of the body, characterized by the fact that the means to reduce the turbulence consist of several, preferably six, ribs (R1–R6) oriented parallel to one another at some distance from one another, and parallel to the longitudinal center plane of the body, which are fastened to the end of the body, project outward, and whose length is approximately 1/10 to 1/20, preferably 1/15, of the length of the body (1), all measured in the direction of the longitudinal center axis (A) of the body (1).

Another feature of the invention resides broadly in a body characterized by the fact that the ratio of the wall thickness of the ribs (R1–R6) to the distance from rib to rib is 1:3 to 1:5, preferably 1:4.

Yet another feature of the invention resides broadly in a body characterized by the fact that the exposed ends of the ribs (R1–R6) are shaped so that their contour corresponds to an end cap with a wall curved outward, fitting the profile (P) of the body.

Still another feature of the invention resides broadly in a body characterized by the fact that on a two-part body 1, 2 with a main body 1 and a secondary body 2 connected to it, there are also corresponding ribs (R7, R8) and spaces on the secondary body 2.

Another feature of the invention resides broadly in a use of the means to reduce turbulence on a stabilizer fin of ships.

Yet another feature of the invention resides broadly in a use of the means to reduce turbulence on a rudder blade with an essentially perpendicular extension on ships.

Still another feature of the invention resides broadly in a use of the means to reduce turbulence on a keel fin or vertical stabilizer on sailboats with a keel.

Yet another feature of the invention resides broadly in a use characterized by the fact that on keel fins with ballast bodies located on the exposed end of the keel fin, the ribs are worked into or onto the ballast bodies.

All, or substantially all, of the components and methods of the various embodiments may be used in any combination with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution in any combination as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A method of reducing turbulence at at least one surface of a vessel caused by the motion of the vessel through water, the vessel having a hull, said method comprising the steps of:

providing an elongated member, the elongated member having a length along the greatest dimension of the elongated member, and the elongated member having a longitudinal axis along the length of the elongated member;

attaching the elongated member to the hull;

the elongated member causes the at least one region of turbulence generated by the motion of the vessel through water;

the elongated member has at least one end located on the longitudinal axis of the elongated member, the at least one region of turbulence located adjacent to the at least one end of the elongated member;

the elongated member comprises at least one member of the group consisting of: a stabilizer fin of a ship, a keel fin of a sailboat without ballast bodies, a keel fin with ballast bodies, and a rudder blade on a ship;

positioning a plurality of planar bodies at the at least one end of the elongated member in the at least one region of turbulence caused by the motion of the vessel through water located adjacent to the at least one end of the elongated member, wherein:

each planar body has a length, a width and a thickness, said thickness being generally less than either of said width and said length;

each planar body has a longitudinal plane defined by the length and width dimensions; and the plurality of planar bodies comprises at least a first group of the planar bodies;

said positioning comprising positioning the first group of the planar bodies such that the longitudinal planes of the members of the first group of the planar bodies are substantially parallel, such that members of the first group of the planar bodies are adjacent and side by side, and such that spaces are formed between the members of the first group of the planar bodies in a direction perpendicular to the longitudinal planes of the members of the first group of the planar bodies; and reducing said turbulence in the at least one region of turbulence with said plurality of planar bodies;

said positioning comprises positioning the planar bodies such that the longitudinal planes of the planar bodies are substantially parallel to the longitudinal axis of the elongated member;

the members of the first group of the planar bodies have widths parallel to the longitudinal axis of the elongated member;

said widths are between approximately 1/10 and approximately 1/20 of the length of the elongated member; and said positioning comprises positioning the first group of the planar bodies such that the longitudinal planes of the members of the first group of the planar bodies are substantially parallel to water flow across the elongated member.

2. The method of reducing turbulence caused by the motion of a vessel through water according to claim 1, wherein the elongated member has a central plane; the elongated member is substantially symmetrical about the central plane; the central plane is parallel to the longitudinal axis of the elongated member; and the elongated member is positionable so that the central plane is substantially parallel to the direction of motion of the vessel; and the elongated member is substantially streamlined.

3. The method of reducing turbulence caused by the motion of a vessel through water according to claim 2, wherein the thicknesses of the members of the first group of the planar bodies are substantially equal;

said positioning comprises positioning the first group of the planar bodies such that the spaces between the members of the first group of the planar bodies in a direction perpendicular to the longitudinal planes of the first portion of the planar bodies are substantially equal; and said positioning comprises positioning the first group of the planar bodies such that the spaces between the members of the first group of the planar bodies in a direction perpendicular to the longitudinal planes of the first group of the planar bodies are between three and five times the thicknesses of the members of the first group of the planar bodies.

4. The method of reducing turbulence caused by the motion of a vessel through water according to claim 3, wherein the plurality of planar bodies comprises a second group of the planar bodies;

said positioning comprises positioning the second group of the planar bodies on the at least one end of the elongated member;

the elongated member comprises a main member and a secondary member attached to the main member;

said positioning comprises positioning the first group of the planar bodies on the main member; and said positioning further comprises positioning the second group of the planar bodies on the secondary member.

5. The method of reducing turbulence caused by the motion of a vessel through water according to claim 4, wherein said positioning comprises positioning the first group of the planar bodies such that the longitudinal planes of the members of the first group of the planar bodies are substantially parallel to the direction of motion of the vessel;

said positioning comprises positioning the planar bodies substantially symmetrically with respect to the central plane of the elongated member;

each of the planar bodies positioned away from the central plane of the elongated member is substantially identical to the planar body positioned substantially symmetrically on the opposite side of the central plane of the elongated member;

a dividing plane is located between the first group of the planar bodies and the second group of the planar bodies;

the dividing plane is perpendicular to the central plane of the elongated member;

the dividing plane having a first side and a second side;

said positioning comprises positioning the first group of the planar bodies on the first side of the dividing plane and the second group of the planar bodies on the second side of the dividing plane;

the members of the second group of the planar bodies have their widths parallel to the longitudinal axis of the elongated member;

said positioning comprises positioning each of the second group of the planar bodies such that the width of each planar body of the second group is generally at least as great at points closer to the dividing plane on each planar body of the second group as at points further from the dividing plane on each planar body of the second group;

said positioning comprises positioning each of the second group of the planar bodies such that a distance between each planar body of the second group and the central plane of the elongated member, in a direction perpendicular to the central plane of the elongated member, is at least as great at points closer to the dividing plane on each planar body of the second group as at points further from the dividing plane on each planar body of the second group;

said positioning comprises positioning the second group of the planar bodies such that the planar bodies converge;

the planar bodies have surfaces defined by the length and the width, disposed substantially along the longitudinal plane of of each planar body, said surfaces being at least one of: curved and flat;

the planar bodies have surfaces defined by the length and the thickness of the planar bodies, said surfaces being rounded off;

the planar bodies have surfaces defined by the width and the thickness of the planar bodies, said surfaces being rounded off;

the planar bodies are substantially streamlined;

the first group of the planar bodies comprises six planar bodies;

the second group of the planar bodies comprises two planar bodies;

the planar bodies are attached to the elongated member;

the planar bodies have first and second ends, the first ends being attached to the elongated body and the second ends extending from the elongated body; and the planar bodies are shaped such that the second ends of the planar bodies would lie in a streamlined curved body placed over the at least one end of the elongated member.

6. An arrangement for reducing turbulence at at least one surface of a vessel caused by the motion of the vessel through water, the vessel comprising a hull, and an elongated member attached to the hull, the elongated member comprising:

a length along the greatest dimension of the elongated member;

a longitudinal axis along the length of the elongated member; and at least one end located on the longitudinal axis of the elongated member;

the elongated member causing the at least one region of turbulence generated by the motion of the vessel through water, the elongated member comprises at least one of the group consisting of a stabilizer fin of a ship, a keel fin of a sailboat without ballast bodies, a keel fin with ballast bodies, and a rudder blade on a ship;

the elongated member defines a central plane, the elongated member being substantially symmetrical about the central plane;

the central plane is parallel to the longitudinal axis of the elongated member;

the elongated member is positionable so that the central plane is substantially parallel to the direction of motion of the vessel; and the elongated member is substantially streamlined; and said arrangement comprising:

a plurality of planar bodies for reducing said turbulence in the at least one region of turbulence caused by the motion of the vessel through water, said plurality of planar bodies being disposed in said at least one region of turbulence at at least one surface of the vessel;

each said planar body having a length, a width and a thickness, said thickness being generally less than either of said width and said length;

each said planar body having a longitudinal plane defined by the length and width dimensions;

the plurality of planar bodies comprise at least a first group of the planar bodies;

said first group of the planar bodies being disposed such that the longitudinal planes of the members of the first group of the planar bodies are substantially parallel, such that members of the first group of the planar bodies are adjacent and side by side, and such that spaces are formed between the members of the first group of the planar bodies in a direction perpendicular to the longitudinal planes of the members of the first group of the planar bodies;

said planar bodies being disposed such that the longitudinal planes of the planar bodies are substantially parallel to the longitudinal axis of the elongated member;

wherein the members of the first group of the planar bodies have widths parallel to the longitudinal axis of the elongated member;

said widths are between approximately 1/10 and approximately 1/20 of the length of the elongated member;

the thicknesses of the members of the first group of the planar bodies are substantially equal;

the first group of the planar bodies are disposed such that the spaces between the members of the first group of the planar bodies in a direction perpendicular to the longitudinal planes of the first portion of the planar bodies are substantially equal; and the first group of the planar bodies are disposed such that the spaces between the members of the first group of the planar bodies in a direction perpendicular to the longitudinal planes of the first group of the planar bodies are between three and five times the thicknesses of the members of the first group of the planar bodies.

7. The arrangement for reducing turbulence caused by the motion of a vessel through water according to claim 6, wherein the plurality of planar bodies comprises a second group of the planar bodies;

said second group of the planar bodies are disposed on the at least one end of the elongated member;

the elongated member comprises a main member and a secondary member attached to the main member;

the first group of the planar bodies are disposed on the main member; and the second group of the planar bodies are disposed on the secondary member.

8. The arrangement for reducing turbulence caused by the motion of a vessel through water according to claim 7, wherein the first group of the planar bodies are disposed such that the longitudinal planes of the members of the first group of the planar bodies are substantially parallel to the direction of motion of the vessel;

the planar bodies are disposed substantially symmetrically with respect to the central plane of the elongated member;

each of the planar bodies disposed away from the central plane of the elongated member is substantially identical to the planar body positioned substantially symmetrically on the opposite side of the central plane of the elongated member;

a dividing plane is located between the first group of the planar bodies and the second group of the planar bodies;

the dividing plane is perpendicular to the central plane of the elongated member;

the dividing plane having a first side and a second side;

the first group of the planar bodies are disposed on the first side of the dividing plane and the second group of the planar bodies are disposed on the second side of the dividing plane;

the members of the second group of the planar bodies have their widths parallel to the longitudinal axis of the elongated member;

each of the second group of the planar bodies is disposed such that the width of each planar body of the second group is generally at least as great at points closer to the dividing plane on each planar body of the second group as at points further from the dividing plane on each planar body of the second group;

each of the second group of the planar bodies is disposed such that a distance between each planar body of the second group and the central plane of the elongated member, in a direction perpendicular to the central plane of the elongated member, is at least as great at points closer to the dividing plane on each planar body of the second group as at points further from the dividing plane on each planar body of the second group;

the second group of the planar bodies are disposed such that the planar bodies converge;

the planar bodies have surfaces defined by the length and the width, disposed substantially along the longitudinal plane of of each planar body, said surfaces being at least one of: curved and flat;

the planar bodies have surfaces defined by the length and the thickness of the planar bodies, said surfaces being rounded off;

the planar bodies have surfaces defined by the width and the thickness of the planar bodies, said surfaces being rounded off;

the planar bodies are substantially streamlined;

the first group of the planar bodies comprises six planar bodies;

the second group of the planar bodies comprises two planar bodies;

the planar bodies are attached to the elongated member;

the planar bodies have first and second ends, the first ends being attached to the elongated body and the second ends extending from the elongated body; and the planar bodies are shaped such that the second ends of the planar bodies would lie in a streamlined curved body placed over the at least one end of the elongated member.

* * * * *